United States Patent
Iwasaki et al.

(10) Patent No.: US 9,678,310 B2
(45) Date of Patent: Jun. 13, 2017

(54) IMAGING LENS AND IMAGING APPARATUS EQUIPPED WITH THE IMAGING LENS

(71) Applicant: FUJIFILM Corporation, Tokyo (JP)

(72) Inventors: Tatsuro Iwasaki, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/857,756

(22) Filed: Sep. 17, 2015

(65) Prior Publication Data
US 2016/0004047 A1 Jan. 7, 2016

Related U.S. Application Data
(63) Continuation of application No. PCT/JP2013/007642, filed on Dec. 26, 2013.

(30) Foreign Application Priority Data

Mar. 25, 2013 (JP) .................. 2013-061647

(51) Int. Cl.
G02B 13/18 (2006.01)
G02B 9/64 (2006.01)
(Continued)

(52) U.S. Cl.
CPC ......... G02B 13/0045 (2013.01); G02B 5/005 (2013.01); G02B 9/34 (2013.01);
(Continued)

(58) Field of Classification Search
CPC .. G02B 13/0045; G02B 9/60; G02B 27/0025; G02B 13/18; G02B 5/005; G02B 13/002; G02B 13/004; G02B 9/34
(Continued)

(56) References Cited

U.S. PATENT DOCUMENTS

| 4,488,788 A | 12/1984 | Fujioka |
| 7,274,515 B2 | 9/2007 | Noda |

(Continued)

FOREIGN PATENT DOCUMENTS

| JP | 58-156916 | 9/1983 |
| JP | 64-057221 | 3/1989 |

(Continued)

OTHER PUBLICATIONS

"International Preliminary Report on Patentability" of PCT/JP2013/007642, mailed on Sep. 8, 2014, with partial English translation thereof, p. 1-p. 6, in which seven of the listed references (JP2008-176185, JP64-057221, JP10-020193, JP58-156916, U.S. Pat. No. 4,488,788, JP03-265809 and JP2004-029474) were cited.

(Continued)

Primary Examiner — Evelyn A Lester
(74) Attorney, Agent, or Firm — Jianq Chyun IP Office

(57) ABSTRACT

An imaging lens is constituted essentially by four or more lenses, including, in order from the object side to the image side: a first lens having a positive refractive power; a second lens having a negative refractive power; and a plurality of other lenses. The conditional formulae below are satisfied.

$$0.8 < TL/f < 1.0 \tag{1}$$

$$1.0 < f/f1 < 3.0 \tag{2}$$

$$2.03 \text{ mm} < f < 5.16 \text{ mm} \tag{3}$$

$$1.0 \text{ mm} < f1 < 3.0 \text{ mm} \tag{4}$$

wherein f is the focal length of the entire lens system, f1 is the focal length of the first lens, TL is the distance along the optical axis from the surface of the first lens toward the object side to the paraxial focal point
(Continued)

position at the image side in the case that the portion corresponding to back focus is an air converted length.

17 Claims, 10 Drawing Sheets

(51) Int. Cl.
    *G02B 13/00*     (2006.01)
    *G02B 9/34*     (2006.01)
    *G02B 9/60*     (2006.01)
    *G02B 9/62*     (2006.01)
    *G02B 5/00*     (2006.01)
    *G02B 27/00*     (2006.01)

(52) U.S. Cl.
    CPC ............... *G02B 9/60* (2013.01); *G02B 9/62* (2013.01); *G02B 13/004* (2013.01); *G02B 27/0025* (2013.01); *G02B 13/002* (2013.01); *G02B 13/18* (2013.01)

(58) Field of Classification Search
    USPC ........ 359/714, 715, 739, 740, 763, 764, 773
    See application file for complete search history.

(56) References Cited

U.S. PATENT DOCUMENTS

| | | | | |
|---|---|---|---|---|
| 9,261,671 | B2* | 2/2016 | Noda | G02B 13/0045 |
| 2008/0180813 | A1* | 7/2008 | Taniyama | G02B 13/006 |
| | | | | 359/715 |
| 2010/0103533 | A1* | 4/2010 | Taniyama | G02B 13/004 |
| | | | | 359/715 |
| 2010/0309367 | A1* | 12/2010 | Iba | G02B 9/34 |
| | | | | 348/345 |
| 2011/0115962 | A1* | 5/2011 | Chen | G02B 9/34 |
| | | | | 348/335 |
| 2011/0249348 | A1* | 10/2011 | Kubota | G02B 13/0045 |
| | | | | 359/764 |
| 2012/0044403 | A1* | 2/2012 | Tang | G02B 13/18 |
| | | | | 348/340 |
| 2012/0044583 | A1* | 2/2012 | Ise | G02B 13/004 |
| | | | | 359/715 |
| 2012/0057071 | A1 | 3/2012 | Yoneyama et al. | |
| 2012/0086848 | A1* | 4/2012 | Tsai | G02B 13/004 |
| | | | | 348/340 |
| 2012/0147249 | A1* | 6/2012 | Okano | G02B 13/004 |
| | | | | 348/340 |
| 2014/0192423 | A1* | 7/2014 | Kondo | G02B 13/18 |
| | | | | 359/714 |

FOREIGN PATENT DOCUMENTS

| | | |
|---|---|---|
| JP | 03-265809 | 11/1991 |
| JP | 10-020193 | 1/1998 |
| JP | 2004-029474 | 1/2004 |
| JP | 2008-176185 | 7/2008 |
| JP | 2012-058407 | 3/2012 |
| JP | 2013-106289 | 5/2013 |
| KR | 2010-0062480 | 6/2010 |

OTHER PUBLICATIONS

"Office Action of Japan Counterpart Application", issued on Dec. 1, 2015, p. 1-p. 3, with a partial English translation thereof.

* cited by examiner

FIG.2 EXAMPLE 2

IMAGING LENS AND IMAGING APPARATUS EQUIPPED WITH THE IMAGING LENS

CROSS REFERENCE TO RELATED APPLICATIONS

The present application is a Continuation of PCT International Application No. PCT/JP2013/007642 filed on Dec. 26, 2013, which claims priority under 35 U.S.C. §119(a) to Japanese Patent Application No. 2013-061647 filed on Mar. 25, 2013. Each of the above applications is hereby expressly incorporated by reference, in its entirety, into the present application.

BACKGROUND

The present disclosure is related to a fixed focus imaging lens for forming optical images of subjects onto an imaging element such as a CCD (Charge Coupled Device) and a CMOS (Complementary Metal Oxide Semiconductor). The present disclosure is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses accompanying this increase.

Imaging lenses in the above technical field have been proposed in U.S. Pat. No. 7,274,515 and Korean Patent Publication No. 2010-0062480, for example. U.S. Pat. No. 7,274,515 discloses an imaging lens having a four or five lens configuration as a two focal point optical system for cellular telephones. Korean Patent Publication No. 2010-0062480 discloses an imaging lens having a five lens configuration, which takes imaging elements having high resolution into consideration.

SUMMARY

Recently, miniaturization of imaging elements is also progressing, and there is demand for miniaturization of imaging apparatuses as a whole as well as imaging lenses to be mounted therein. Particularly, demand for shortening of the total lengths of lenses is increasing for imaging lenses which are employed in devices such as smart phones and tablet terminals, which are becoming progressively thinner. In addition, angles of view of photography are an important item in the above devices. Therefore, there is demand for high resolution and a shortening of the total lengths of lenses, while maintaining an angle of view which is standard for portable terminals.

It is necessary for the imaging lens disclosed in U.S. Pat. No. 7,274,515 to further shorten the total length thereof, in order to satisfy all of the above demands. In addition, it is necessary for the imaging lens disclosed in Korean Patent Publication No. 2010-0062480 above to widen the angle of view and to further shorten the total length thereof.

The present disclosure has been developed in view of the foregoing points. The present disclosure provides an imaging lens that can realize a shortening of the total length and high imaging performance which is compatible with an increased number of pixels, while maintaining an angle of view which is standard for portable terminals. The present disclosure also provides an imaging apparatus equipped with this imaging lens, which is capable of obtaining high resolution photographed images.

An imaging lens of the present disclosure consists of four or more lenses, including, in order from the object side to the image side:

a first lens having a positive refractive power;
a second lens having a negative refractive power; and
a plurality of other lenses;
in which the conditional formulae below are satisfied.

$$0.8 < TL/f < 1.0 \tag{1}$$

$$1.0 < f/fl < 3.0 \tag{2}$$

$$2.03 \text{ mm} < f < 5.16 \text{ mm} \tag{3}$$

$$1.0 \text{ mm} \leq fl < 3.0 \text{ mm} \tag{4}$$

wherein f is the focal length of the entire lens system, fl is the focal length of the first lens, and TL is the distance along the optical axis from the surface of the first lens toward the object side to the paraxial focal point position at the image side, in which the portion corresponding to back focus is an air converted length.

In the imaging lens of the present disclosure, it is preferable for at least one of Conditional Formulae (1-1) through (5-2) below to be satisfied. Note that as a preferable aspect, one or arbitrary combinations of Conditional Formulae (1-1) through (5-2) may be satisfied.

$$0.9 < TL/f < 1.0 \tag{1-1}$$

$$1.2 < f/fl < 2.5 \tag{2-1}$$

$$1.7 < f/fl < 2.0 \tag{2-2}$$

$$0.003 < Da/f < 0.050 \tag{5}$$

$$0.004 < Da/f < 0.040 \tag{5-1}$$

$$0.005 < Da/f < 0.030 \tag{5-2}$$

wherein Da is the distance along the optical axis between the first lens and the second lens.

It is preferable for the imaging lens of the present disclosure to consist of six or fewer lenses.

In the imaging lens of the present disclosure, it is preferable for the surface of the second lens toward the image side to be a concave surface.

In the imaging lens of the present disclosure, it is preferable for a second negative lens from the object side to have a concave surface toward the object side, among negative lenses within the entire lens system.

In the imaging lens of the present disclosure, it is preferable for the lens most toward the image side to be a negative lens having a concave surface toward the image side.

In the imaging lens of the present disclosure, it is preferable for an aperture stop to be positioned at the object side of the surface of the second lens toward the object side.

In the imaging lens of the present disclosure, it is preferable for the surface toward the image side of the lens most toward the image side to be an aspherical surface having an inflection point, which is concave in the vicinity of the optical axis.

Among the lenses that constitute the imaging lens of the present disclosure, the plurality of lenses other than the first lens and the second lens may consist of three lenses including, in order from the object side to the image side, a third lens having a positive refractive power, a fourth lens having a negative refractive power, and a fifth lens having a negative refractive power.

Among the lenses that constitute the imaging lens of the present disclosure, the plurality of lenses other than the first lens and the second lens may consist of two lenses including, in order from the object side to the image side, a third lens having a positive refractive power and a fourth lens having a negative refractive power.

Among the lenses that constitute the imaging lens of the present disclosure, the plurality of lenses other than the first lens and the second lens may consist of four lenses including, in order from the object side to the image side, a third lens having a negative refractive power, a fourth lens having a positive refractive power, a fifth lens having a positive refractive power, and a sixth lens having a negative refractive power.

In the imaging lens of the present disclosure and the preferred configurations thereof, the term "consist(s) of" means that the imaging lens of the present disclosure may also include lenses that practically have no power, optical elements other than lenses such as a stop and a cover glass, and mechanical components such as lens flanges, a lens barrel, a camera shake correcting mechanism, etc., in addition to the lenses listed as constituent elements.

In addition, in the present disclosure, compound aspherical lenses (a lens constituted by a spherical lens and a film having an aspherical shape formed integrally on the spherical lens) are not considered to be cemented lenses, but are treated as single lenses.

Note that the shapes of the surfaces and the signs of the refractive powers of the lenses of the imaging lens of the present disclosure and the preferred configurations thereof are those in the vicinity of the optical axis (paraxial region) for lenses that include aspherical surfaces, unless otherwise noted.

An imaging apparatus of the present disclosure is equipped with the imaging lens of the present disclosure.

In the imaging lens of the present disclosure, a positive lens and a negative lens are provided as the first and second lenses in order from the object side, the imaging lens is constituted by four or more lenses, and configured to satisfy predetermined conditional formulae. Therefore, an imaging lens that can has a shortened the total length and high imaging performance which is compatible with an increased number of pixels, while maintaining an angle of view which is standard for portable terminals can be realized.

The imaging apparatus of the present disclosure is equipped with the imaging lens of the present disclosure. Therefore, photography is enabled with an angle of view which is standard for portable terminals, the size of the apparatus can be shortened in the direction of the optical axis of the imaging lens, and high resolution photographed images can be obtained.

DETAILED DESCRIPTION OF THE PREFERRED EMBODIMENTS

Hereinafter, embodiments of the present disclosure will be described in detail with reference to the attached drawings.

Figure 1:
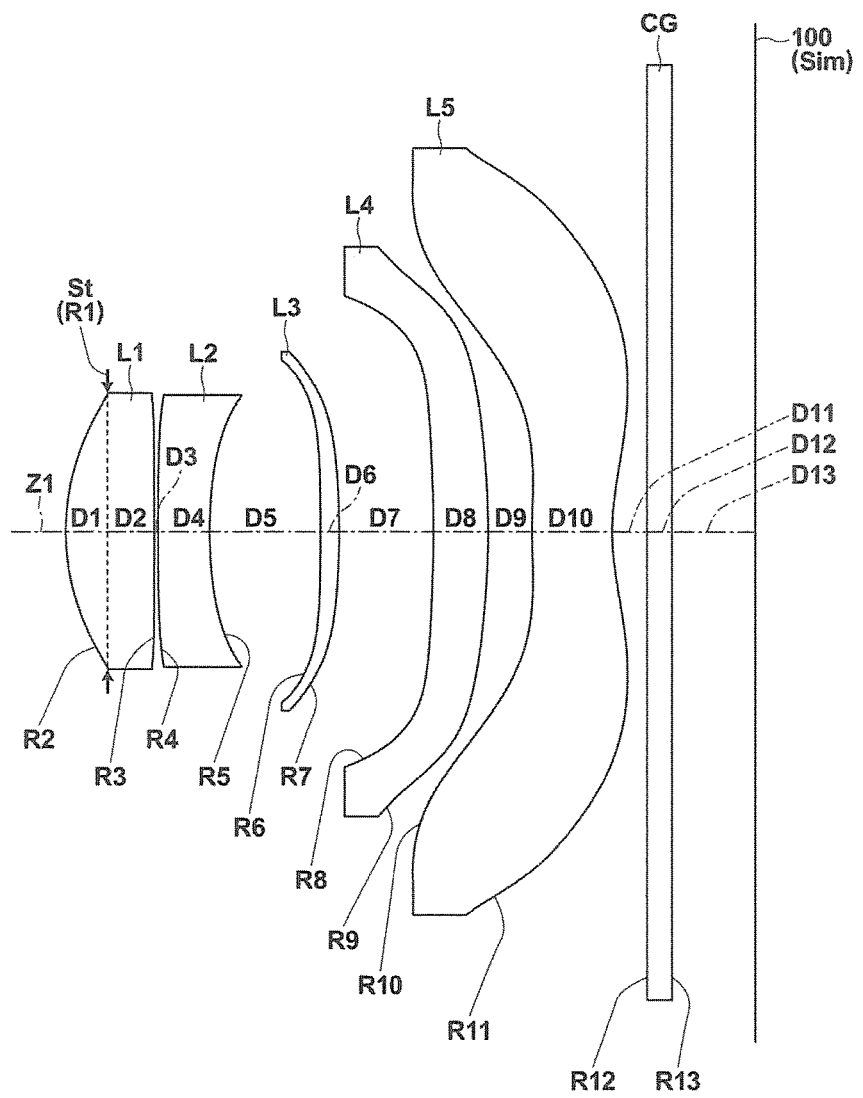
FIG. 1 is a sectional diagram that illustrates a first example of the configuration of an imaging lens according to an embodiment of the present disclosure, and corresponds to a lens of Example 1.
Figure 2:
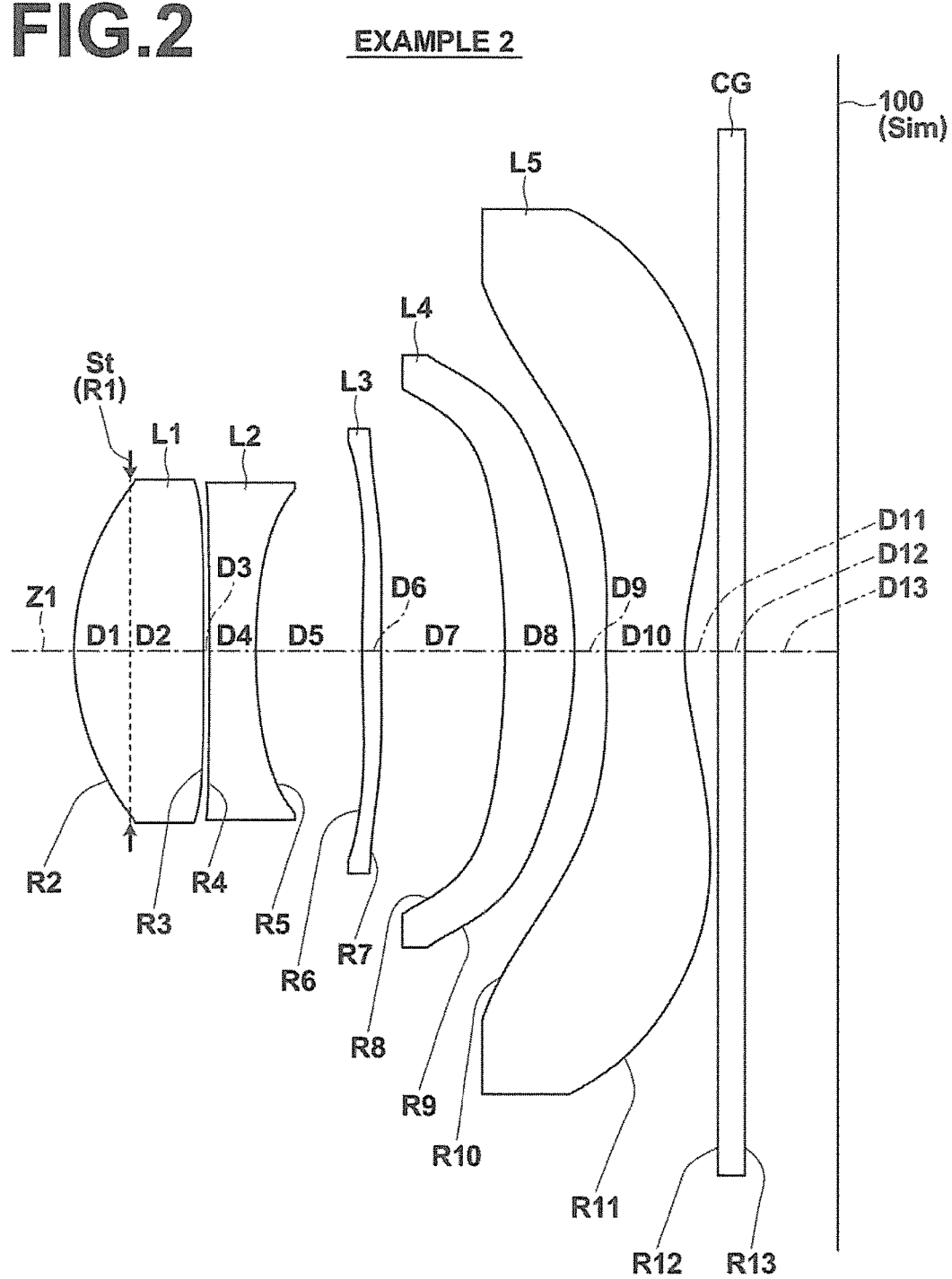
FIG. 2 is a sectional diagram that illustrates a second example of the configuration of an imaging lens according to an embodiment of the present disclosure, and corresponds to a lens of Example 2.
Figure 3:
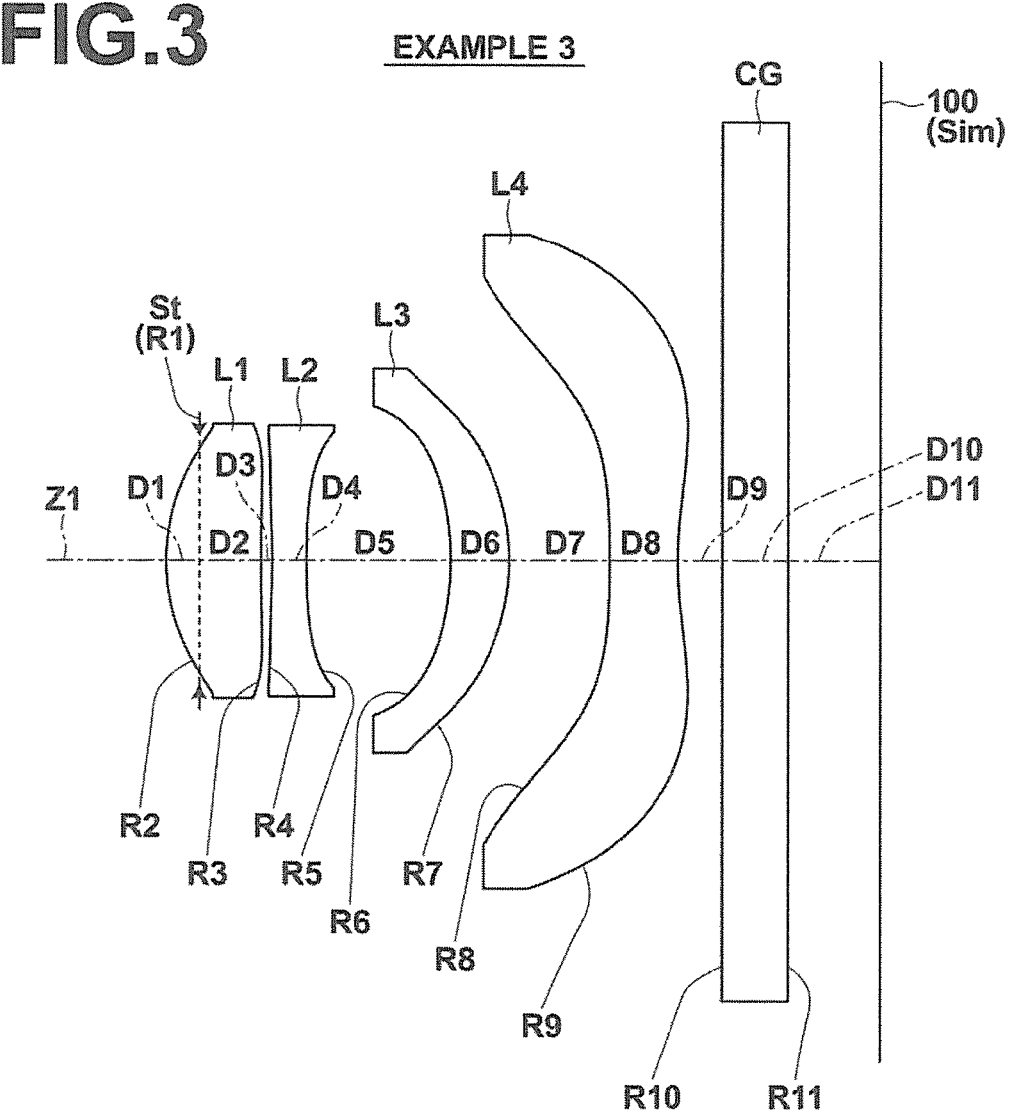
FIG. 3 is a sectional diagram that illustrates a third example of the configuration of an imaging lens according to an embodiment of the present disclosure, and corresponds to a lens of Example 3.
Figure 4:
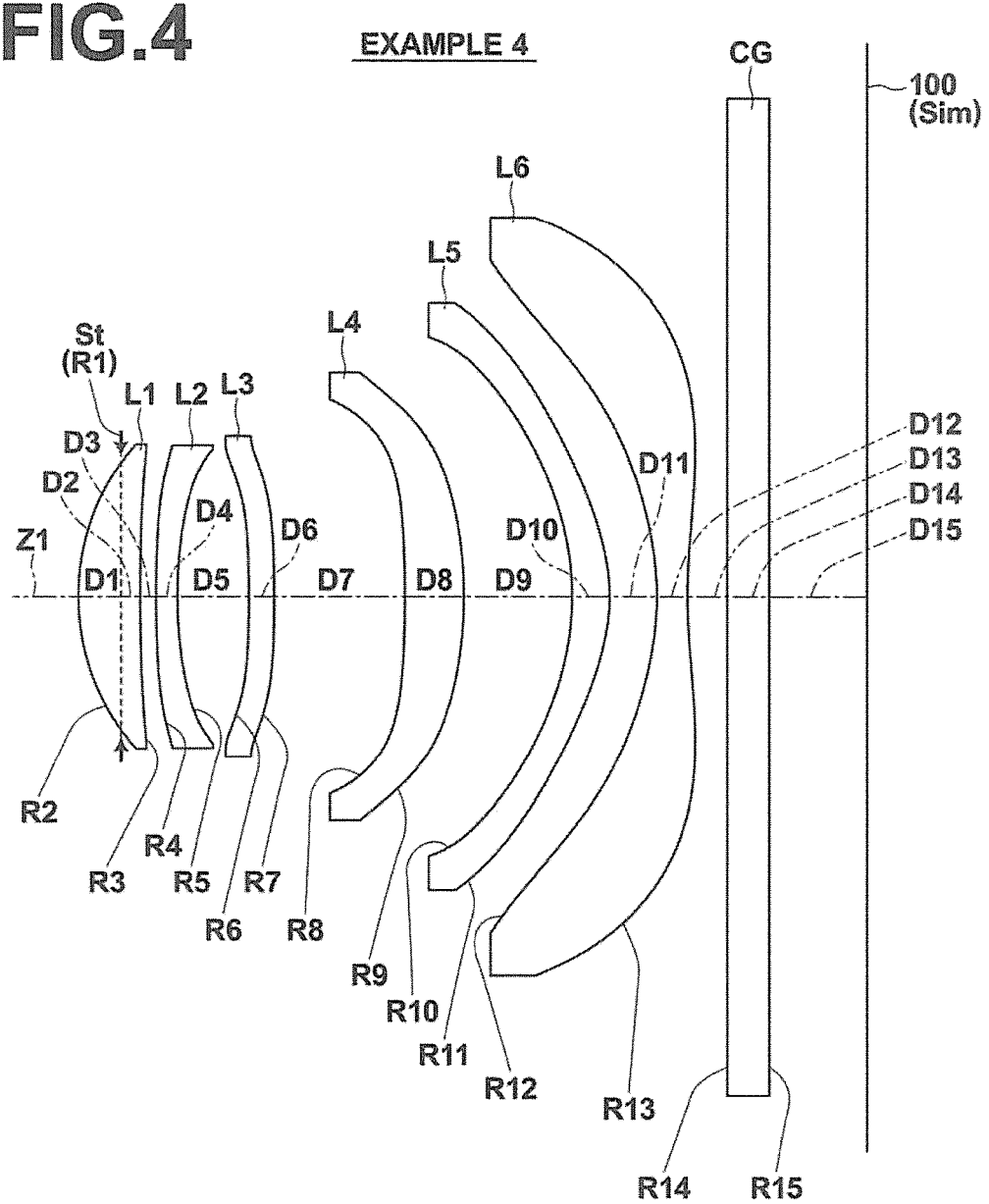
FIG. 4 is a sectional diagram that illustrates a fourth example of the configuration of an imaging lens according to an embodiment of the present disclosure, and corresponds to a lens of Example 4.
Figure 5:
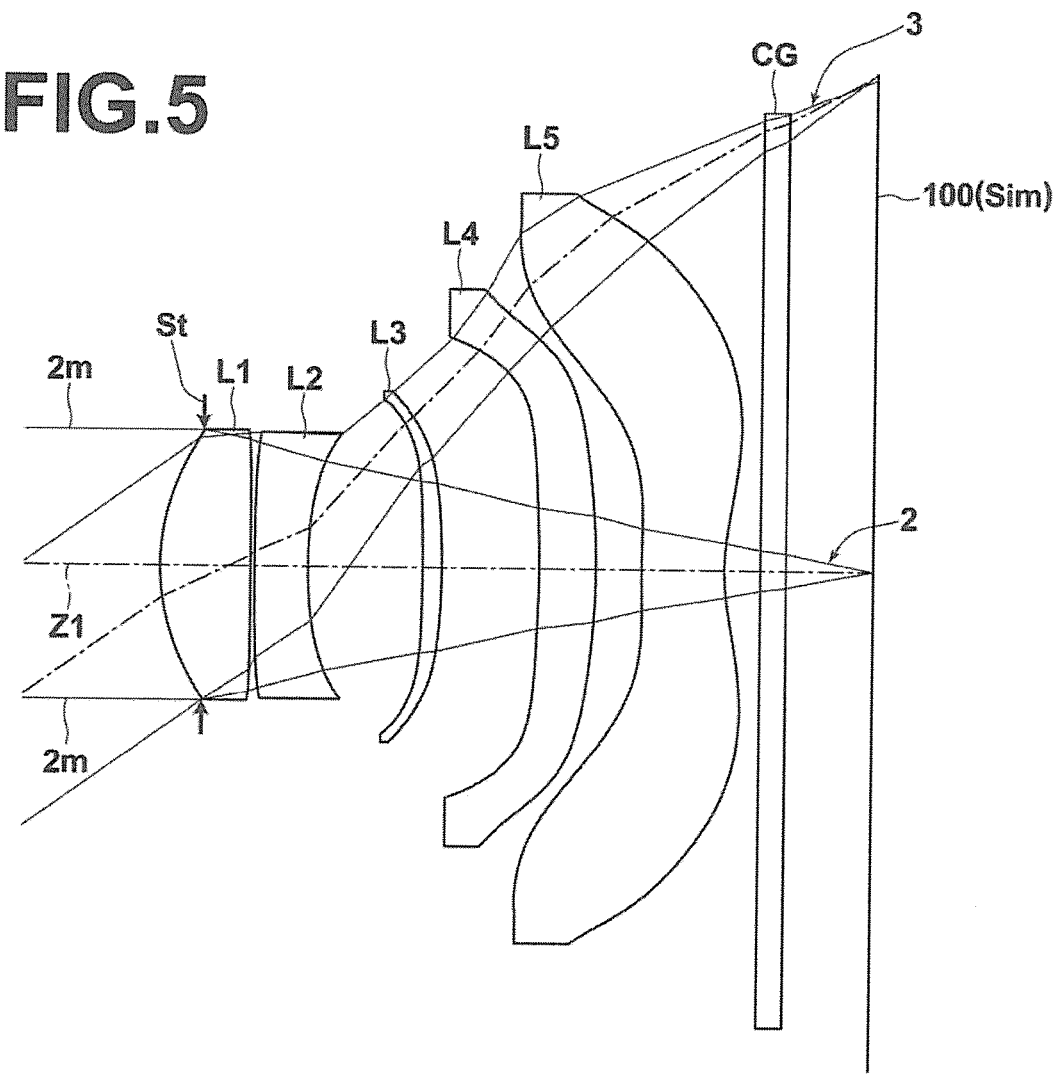
FIG. 5 is a diagram that illustrates the paths of light rays that pass through the imaging lens of FIG. 1.

FIG. 1 illustrates a first example of the configuration of an imaging lens according to an embodiment of the present disclosure. This example corresponds to the lens configuration of Numerical Example 1 (Table 1 and Table 2), to be described later. Similarly, FIG. 2 through FIG. 4 are sectional diagrams that illustrate second through fourth examples of lens configurations that correspond to Numerical Examples 2 through 4 (Table 3 through Table 8). In FIGS. 1 through 4, the symbol Ri represents the radii of curvature of ith surfaces (i=1, 2, 3 . . . ; to be described in detail later). The symbol Di represents the distances between an ith surface and an i+1 st surface along an optical axis Z1. Note that the basic configurations of the examples are the same, and therefore a description will be given of the imaging lens of FIG. 1 as a base, and the examples of FIGS. 2 through 4 will also be described as necessary. In addition, FIG. 5 is a diagram that illustrates the paths of light rays that pass through the imaging lens L of FIG. 1. FIG. 5 illustrates the paths of axial light beams 2 and maximum angle of view light beams 3 from an object at a distance of infinity.

The imaging lens L of the embodiment of the present disclosure is favorably employed in various imaging devices that employ imaging elements such as a CCD and a CMOS. The imaging lens L of the embodiment of the present disclosure is particularly favorable for use in comparatively miniature portable terminal devices, such as a digital still camera, a cellular telephone with a built in camera, a smart phone, a tablet type terminal, and a PDA.

Figure 10:
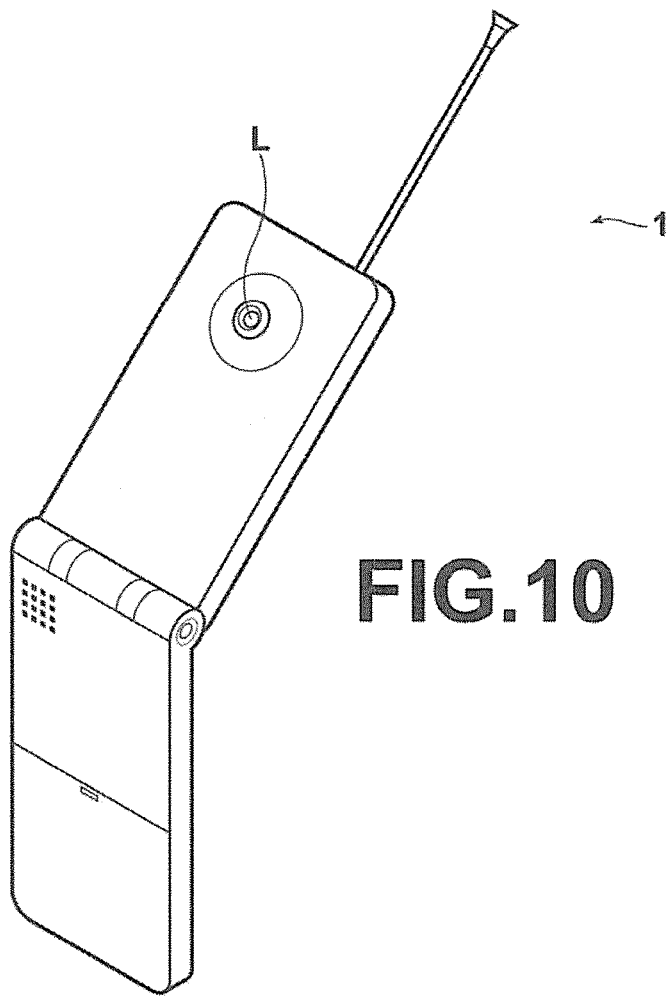
FIG. 10 is a diagram that illustrates a cellular telephone as an imaging apparatus equipped with the imaging lens of the present disclosure.

FIG. 10 schematically illustrates a cellular telephone as an imaging apparatus 1 according to an embodiment of the present disclosure. The imaging apparatus 1 of the embodiment of the present disclosure is equipped with the imaging lens L according to the embodiment of the present disclosure and an imaging element 100 (refer to FIG. 1) such as a CCD that outputs image signals corresponding to optical images formed by the imaging lens L. The imaging element 100 is provided such that the imaging surface thereof matches the position of an image formation plane Sim.

Figure 11:
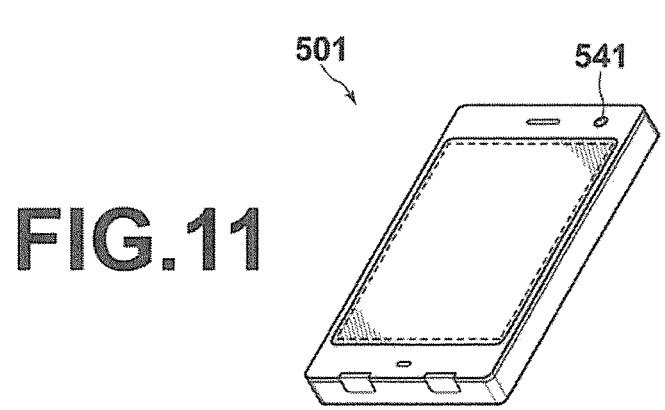
FIG. 11 is a diagram that illustrates a smart phone as an imaging apparatus equipped with the imaging lens of the present disclosure.

FIG. 11 schematically illustrates a smart phone as an imaging apparatus 501 according to an embodiment of the present disclosure. The imaging apparatus 501 of the embodiment of the present disclosure is equipped with a camera section 541 having the imaging lens L according to the embodiment of the present disclosure and an imaging element 100 (refer to FIG. 1) such as a CCD that outputs image signals corresponding to optical images formed by the imaging lens L. The imaging element 100 is provided such that the imaging surface thereof matches the position of the image formation plane Sim.

The imaging lens L is constituted essentially by four or more lenses, which are, in order from the object side to the image side, a first lens L1 having a positive refractive power, a second lens L2 having a negative refractive power, and a plurality of other lenses. It is more advantageous from the viewpoint of improving performance to have a greater number of lenses. However, if increases in cost and spatial restrictions related to the shortening of the total length of the lens system are taken into consideration, it is preferable for the number of lenses that essentially constitute the entire lens system to be six or fewer.

For example, the imaging lens L may be constituted essentially by five lenses, which are, in order from the object side to the image side, a first lens L1 having a positive refractive power, a second lens L2 having a negative refractive power, a third lens L3 having a positive refractive power, a fourth lens L4 having a negative refractive power, and a fifth lens L5 having a negative refractive power, as illustrated in FIG. 1 and FIG. 2. Adopting such a five lens configuration is advantageous from the viewpoint of realizing both high performance and a shortening of the total length of the lens system.

Alternatively, the imaging lens L may be constituted essentially by four lenses, which are, in order from the object side to the image side, a first lens L1 having a positive refractive power, a second lens L2 having a negative refractive power, a third lens L3 having a positive refractive power, and a fourth lens L4 having a negative refractive power, as illustrated in FIG. 3. Adopting such a four lens configuration is more advantageous from the viewpoint of realizing a shortening of the total length of the lens system and a decrease in cost.

As a further alternative, the imaging lens L may be constituted essentially by six lenses, which are, in order from the object side to the image side, a first lens L1 having a positive refractive power, a second lens L2 having a negative refractive power, a third lens L3 having a negative refractive power, a fourth lens L4 having a positive refractive power, a fifth lens L5 having a positive refractive power, and a sixth lens L6 having a negative refractive power, as illustrated in FIG. 4. Adopting such a six lens configuration is more advantageous from the viewpoint of realizing high performance.

Various optical members CG may be provided between the lens provided most toward the image side and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the lens to obtain the same effect as that of the optical member CG. In this case, the number of parts can be reduced, and the total length of the lens system can be shortened.

In the case that an aperture stop St is provided in the imaging lens L, it is preferable for the aperture stop St to be positioned at the object side of the surface of the second lens L2 toward the object side. By positioning the aperture stop St at the object side of the surface of the second lens L2 toward the object side in this manner, increases in the incident angles of light rays that pass through the optical system and enter the image formation plane Sim (that is, the imaging element 100) can be suppressed, particularly at peripheral portions of an imaging region. It is more preferable for the aperture stop St to be positioned at the object side of the surface of the first lens L1 toward the object side, in order to cause this advantageous effect to become more prominent.

Note that the aperture stops St illustrated in the FIG. 1 through FIG. 5 do not necessarily represent the sizes or shapes thereof, but indicate the positions thereof on the optical axis Z1. In addition, the expression "positioned at the object side of the surface of the second lens toward the object side" means that the position of the aperture stop St in the direction of the optical axis is at the same position as the intersection of marginal axial rays of light 2m (refer to FIG. 5) and the surface of the second lens L2 toward the object side, or more toward the object side than this position. Similarly, the expression "positioned at the object side of the surface of the first lens L1 toward the object side" means that the position of the aperture stop in the direction of the optical axis is at the same position as the intersection of marginal axial rays of light 2m and the surface of the first lens L1 toward the object side, or more toward the object side than this position.

In the examples of the configurations illustrated in FIG. 1 through FIG. 4, the aperture stop St is positioned at the image side of the apex of the surface of the first lens L1 toward the object side. However, the present disclosure is not limited to such a configuration, and the aperture stop St may be positioned at the object side of the apex of the surface of the first lens L1 toward the object side. A case in which the aperture stop St is positioned at the object side of the apex of the surface of the first lens L1 toward the object side is somewhat disadvantageous from the viewpoint of securing peripheral light intensity compared to a case in which the aperture stop St is positioned at the image side of the apex of the surface of the first lens L1. However, increases in the incident angles of light rays that pass through the optical system and enter the image formation plane (imaging element) can be further suppressed at the peripheral portions of the imaging region.

In the imaging lens L, the first lens L1 has a positive refractive power in the vicinity of the optical axis. Thereby, the total length of the lens system can be favorably shortened. In addition, it is preferable for the first lens L1 to have a convex surface toward the object side in the vicinity of the optical axis. In this case, the surface most toward the object side in the lens system will be of a convex shape. As a result, the position of the rearward principal point can be moved toward the object side, and the total length of the lens system can be favorably shortened.

The second lens L2 has a negative refractive power in the vicinity of the optical axis. It is preferable for the second lens L2 to have a concave surface toward the image side in the vicinity of the optical axis. In this case, the total length of the lens system can be favorably shortened, and spherical aberration can be favorably corrected.

It is preferable for the imaging lens L to have two or more negative lenses. In this case, the negative refractive power required in the entire lens system can be distributed, which is advantageous from the viewpoint of favorably correcting aberrations.

In the case that the imaging lens L has two or more negative lenses, it is preferable for the surface toward the object side of the second negative lens from the object side among the negative lenses of the entire lens system to be a concave surface in the vicinity of the optical axis. In this case, the total length of the lens system can be favorably shortened, and the generation of differences in spherical aberration depending on wavelength can be suppressed with respect to light rays of different wavelengths.

It is preferable for the lens provided most toward the image side to have a negative refractive power. In this case, a shortening of the total length of the lens system can be favorably realized. Further, it is preferable for the surface toward the image side of the lens provided most toward the image side to be concave in the vicinity of the optical axis. This configuration is further advantageous from the viewpoint of shortening the total length of the lens system.

It is preferable for the surface toward the image side of the lens most toward the image side to be of an aspherical shape having an inflection point within the effective diameter thereof. In this case, increases in the incident angles of light rays that pass through the optical system with respect to the imaging formation plane Sim (that is, the imaging element 100) can be suppressed, particularly at peripheral portions of the imaging region. Note that here, "having an inflection point" means that the surface toward the image side of the lens most toward the image side has a point at which a curve formed by the cross section of the surface toward the image side of the lens most toward the image side within the effective diameter that includes the optical axis Z1 changes from a convex shape to a concave shape (or from a concave shape to a convex shape).

It is favorable for at least one of the surfaces of all of the lenses within the entire lens system to be an aspherical surface, in order to improve performance.

In addition, it is preferable for all of the lenses that constitute the imaging lens L to be a single lens, not a cemented lens. In the case that all of the lenses that constitute the imaging lens L is a single lens, the number of aspherical lens surfaces will be greater than that for a case in which any of the lenses is a cemented lens. Therefore, the degree of freedom in the design of each lens will increase. As a result, the total length of the lens system can be favorably shortened.

In addition, in the case that the configurations of each of the lenses of the imaging lens L are set such that the full angle of view is 70 degrees or greater as in the example illustrated in FIG. 5, the imaging lens L may be favorably applied to cellular telephone terminals and the like, which are often used for close distance photography. It is preferable for the imaging lens L to be configured such that the full angle of view is 70 degrees or greater for this reason.

Next, the operation and effects of conditional formulae related to the imaging lens L configured as described above will be described in greater detail. First, the imaging lens L is configured such that Conditional Formulae (1) through (4) below are satisfied.

$$0.8 < TL/f < 1.0 \quad (1)$$

$$1.0 < f/f1 < 3.0 \quad (2)$$

$$2.03 \text{ mm} \leq f < 5.16 \text{ mm} \quad (3)$$

$$1.0 \text{ mm} \leq f1 < 3.0 \text{ mm} \quad (4)$$

wherein f is the focal length of the entire lens system, f1 is the focal length of the first lens, and TL is the distance along the optical axis from the surface of the first lens toward the object side to the paraxial focal point position at the image side, in which the portion corresponding to back focus is an air converted length.

Conditional Formula (1) defines a preferable range for the ratio of the total length of the lens system with respect to the focal length of the entire lens system. By securing the ratio of the total length of the lens system and the focal length of the entire lens system such that the value of TL/f is not less than or equal to the lower limit defined in Conditional Formula (1), it will be possible to correct various aberrations while maintaining a full angle of view which is standard for portable terminals and the like, approximately 70 degrees for example. As a result, it will become possible to realize high resolution. By suppressing the ratio of the total length of the lens system and the focal length of the entire lens system such that the value of TL/f is not greater than or equal to the upper limit defined in Conditional Formula (1), the length of the lens system as a whole can be shortened in the direction of the optical axis.

By configuring the imaging lens such that Conditional Formula (1) is satisfied, it will be possible to correct various aberrations while maintaining a full angle of view which is standard for portable terminals and the like, approximately 70 degrees for example, thereby realizing high resolution, and the total length of the lens system as a whole can be shortened. It is more preferable for Conditional Formula (1-1) to be satisfied, in order to cause these advantageous effects to become more prominent.

$$0.9 < TL/f < 1.0 \quad (1\text{-}1)$$

Conditional Formula (2) defines a preferable range for the ratio of the focal length of the entire lens system with respect to the focal length of the first lens L1. That is, Conditional Formula (2) defines a preferable range of numerical values for the ratio of the refractive power of the first lens L1 with respect to the refractive power of the entire lens system. By securing the positive refractive power of the first lens L1 such that the value of f/f1 is not less than or equal to the lower limit defined in Conditional Formula (2), a shortening of the total length of the lens system can be favorably realized. By suppressing the positive refractive power of the first lens L1 such that the value of f/f1 is not greater than or equal to the upper limit defined in Conditional Formula (2), correction of spherical aberration and astigmatism will be facilitated.

By configuring the lens provided most toward the object side to be a positive lens, and by allotting an amount of positive refractive power to this positive lens such that Conditional Formula (2) is satisfied, a shortening of the total length of the lens system can be favorably achieved, while spherical aberration and astigmatism can be favorably corrected. It is more preferable for Conditional Formula (2-1) to be satisfied, and even more preferable for Conditional Formula (2-2) to be satisfied, in order to cause these advantageous effects to become more prominent.

$$1.2 < f/f1 < 2.5 \quad (2\text{-}1)$$

$$1.7 < f/f1 < 2.0 \quad (2\text{-}2)$$

Conditional Formula (3) defines a preferable range for the focal length of the entirety of a compact lens system which is favorably suited for portable terminals and the like. By setting the focal length of the entire lens system such that the value of f is not less than or equal to the lower limit defined in Conditional Formula (3), a predetermined total length can be secured for the lens system. As a result, a number of lenses capable of favorably correcting aberrations, as well as a cover glass, filters, etc. may be provided. By setting the focal length of the entire lens system such that the value of f is not greater than or equal to the upper limit defined in Conditional Formula (3), the total length of the lens system can be suppressed, and a compact lens system which is favorably suited for portable terminals and the like can be realized. By configuring the imaging lens such that Conditional Formula (3) is satisfied, space for providing optical components that enable obtainment of images having high image quality can be secured, while realizing a compact lens system which is favorably suited for portable terminals and the like.

Note that the ratio of the total length of the lens system with respect to the focal length of the entire lens system can be maintained within a predetermined range by Conditional Formula (1) being satisfied. However, by Conditional Formula (3) being further satisfied in addition to Conditional Formula (1), the actual dimensions of the total length of the lens system can be maintained within a predetermined range. As a result, it will be possible to satisfy demand for both high performance and miniaturization, which is required of imaging lenses to be mounted on recent portable terminals and the like.

Conditional Formula (4) defines a preferable range for the focal length of the first lens L1 in a compact lens system which is favorably suited for portable terminals and the like. By suppressing the refractive power of the first lens L1 such that the value of f1 is not less than or equal to the lower limit defined in Conditional Formula (4), correction of spherical aberration and astigmatism will be facilitated. By securing the refractive power of the first lens L1 such that the value of f1 is not greater than or equal to the upper limit defined in Conditional Formula (4), a shortening of the total length of the lens system can be favorably realized. By configuring the lens system such that Conditional Formula (4) is satisfied, a shortening of the total length can be achieved, while spherical aberration and astigmatism can be favorably corrected.

By configuring the imaging lens such that Conditional Formula (2) is satisfied in addition to Conditional Formulae (3) and (4), high resolution can be achieved, while a compact lens system which is favorably suited for portable terminals and the like can be realized. In addition, by Conditional Formulae (1) through (4) being satisfied at the same time, a lens system having high resolution and a shortened total length can be realized, while maintaining a full angle of view which is standard for portable terminals and the like, 70 degrees for example.

In addition, it is preferable for Conditional Formula (5) to be satisfied in the imaging lens L.

$$0.003 < Da/f < 0.050 \quad (5)$$

wherein Da is the distance along the optical axis from the first lens to the second lens.

Da corresponds to the distance D3 in the example illustrated in FIG. 1. Conditional Formula (5) defines a preferable range for the ratio of the distance between the first lens L1 and the second lens L2 with respect to the focal length of the entire lens system. By securing the distance between the first lens L1 and the second lens L2 such that the value of Da/f is not less than or equal to the lower limit defined in Conditional Formula (5), the distance between the first lens L1 and the second lens L2 becoming short and causing assembly to become difficult can be prevented. Suppressing the distance between the first lens L1 and the second lens L2 such that the value of Da/f is not greater than or equal to the upper limit defined in Conditional Formula (5) is advantageous from the viewpoint of shortening the total length of the lens system.

By configuring the imaging lens such that Conditional Formula (5) is satisfied, the total length of the lens system can be favorably shortened, while a deterioration in productivity can be suppressed. It is more preferable for Conditional Formula (5-1), and even more preferable for Conditional Formula (5-2) to be satisfied, in order to cause these advantageous effects to become more prominent.

$$0.004 < Da/f < 0.040 \quad (5\text{-}1)$$

$$0.005 < Da/f < 0.030 \quad (5\text{-}2)$$

Note that arbitrary combinations of the preferred configurations described above are possible. It is preferable for the preferred configurations to be selectively adopted as appropriate according on specifications required of the imaging lens.

Next, specific examples of numerical values of the imaging lens of the present disclosure will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the surface of the aperture stop St designated as first and the lens surface at the most object side (the surface of the first lens L1 toward the object side) designated as second, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj.

Note that the signs of the radii of curvature are positive in cases that the surface shape is convex toward the object side, and negative in cases that the surface shape is convex toward the image side. The signs of the distances between surfaces are positive in cases that the direction from a surface Si toward a surface Si+1 is from the object side to the image side, and negative in cases that the direction from a surface Si toward a surface Si+1 is from the image side to the object side. Table 1 shows data related to the imaging lens and the optical member CG.

Note that the focal length f of the entire lens system (mm), the F number Fno, the full angle of view 2ω (°), and the total length TL (mm) of the lens system are shown as various items of data above the frame of Table 1. Note that the total length TL of the lens system is the distance along the optical axis from the surface of the first lens L1 toward the object side to the position of a paraxial focal point at the image side, in which the portion corresponding to the back focus Bf is an air converted value.

In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients An and K represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - (1+K) \times C^2 \times h^2}} + \sum_n An \times h^n \quad (A)$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 4 or greater and 16 or less), and K is a conic constant.

Specific lens data corresponding to the configuration of the imaging lens illustrated in FIG. 2 are shown in Table 3 and Table 4 as Example 2. Similarly, specific lens data corresponding to the configurations of the imaging lenses illustrated in FIG. 3 and FIG. 4 are shown in Table 5 through Table 8 as Example 3 and Example 4. The aspherical surface coefficient n of the second through fifth surfaces of Example 3 and all of the aspherical surfaces of Example 4 are even numbers 4 or greater and 14 or less. In the imaging lenses of Example 1 through Example 4, both of the surfaces of all of the lenses are aspherical surfaces.

Figure 6:
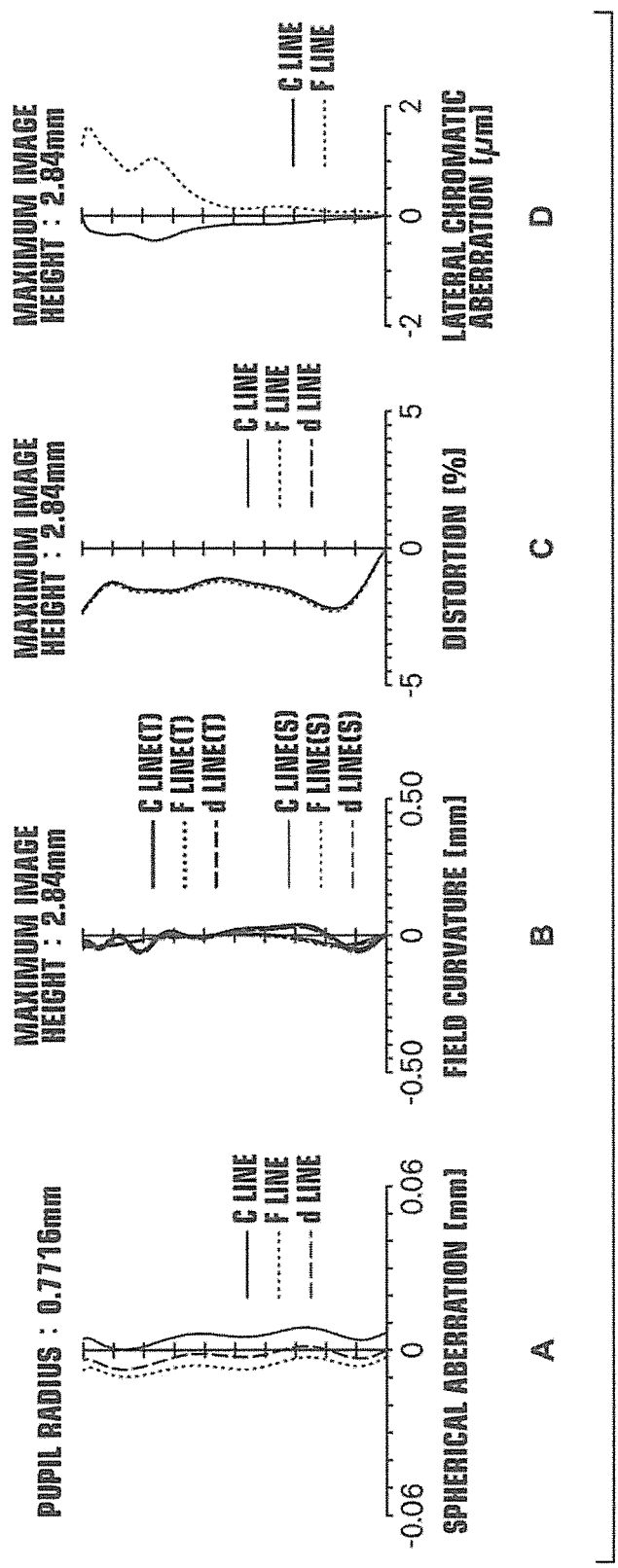
FIG. 6 is a collection of diagrams that illustrate aberrations of the imaging lens of Example 1, wherein A illustrates spherical aberration, B illustrates astigmatism, C illustrates distortion, and D illustrates lateral chromatic aberration.

A through D of FIG. 6 are diagrams that illustrate aberrations of the imaging lens of Example 1, that respectively illustrate the spherical aberration, the field curvature, the distortion, and the lateral chromatic aberration (chromatic aberration of magnification). Each of the diagrams that illustrate the spherical aberration and the field curvature illustrate aberrations related to the d line (wavelength: 587.56 nm), the F line (wavelength: 486.1 nm), and the C line (wavelength: 656.27 nm). The diagram that illustrates lateral chromatic aberration shows aberrations related to the F line and the C line, with the d line as a reference wavelength. In the diagram that illustrates field curvature, (S) denotes aberration in the sagittal direction, and (T) denotes aberration in the tangential direction.

Figure 7:
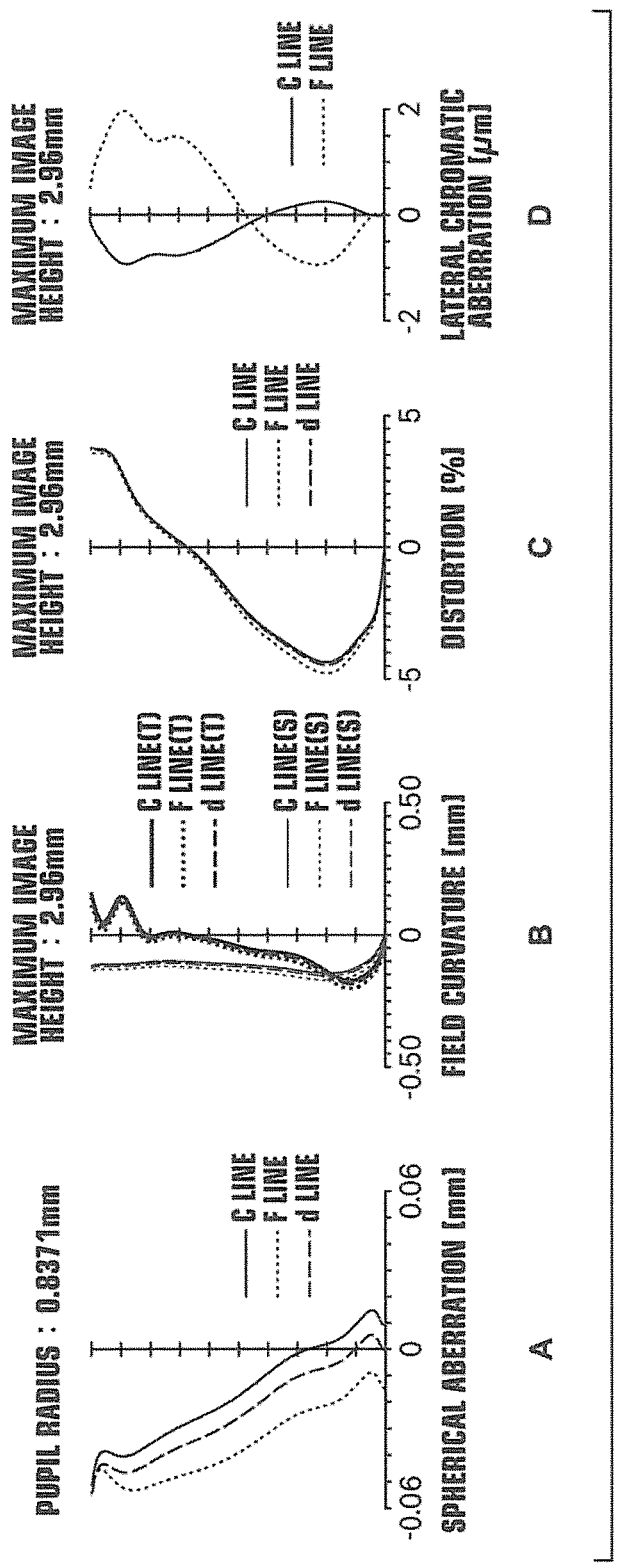
FIG. 7 is a collection of diagrams that illustrate aberrations of the imaging lens of Example 2, wherein A illustrates spherical aberration, B illustrates astigmatism, C illustrates distortion, and D illustrates lateral chromatic aberration.
Figure 8:
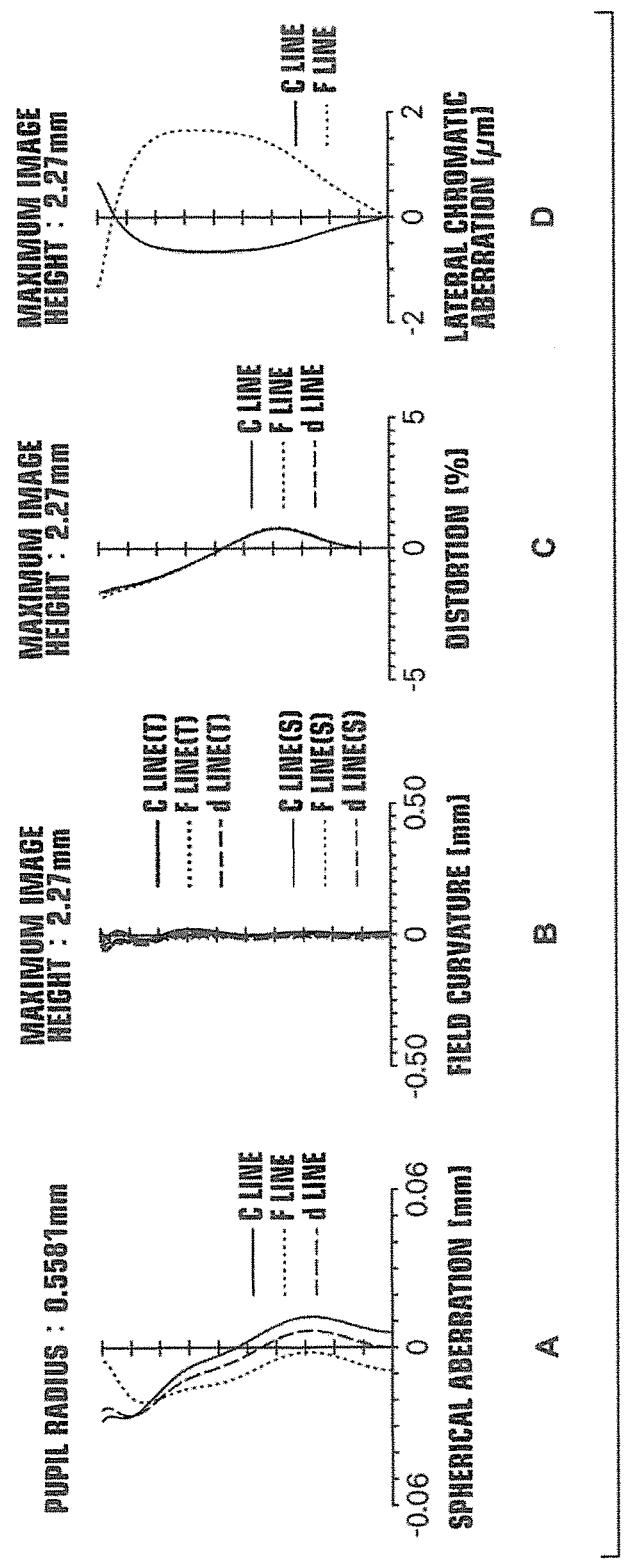
FIG. 8 is a collection of diagrams that illustrate aberrations of the imaging lens of Example 3, wherein A illustrates spherical aberration, B illustrates astigmatism, C illustrates distortion, and D illustrates lateral chromatic aberration.
Figure 9:
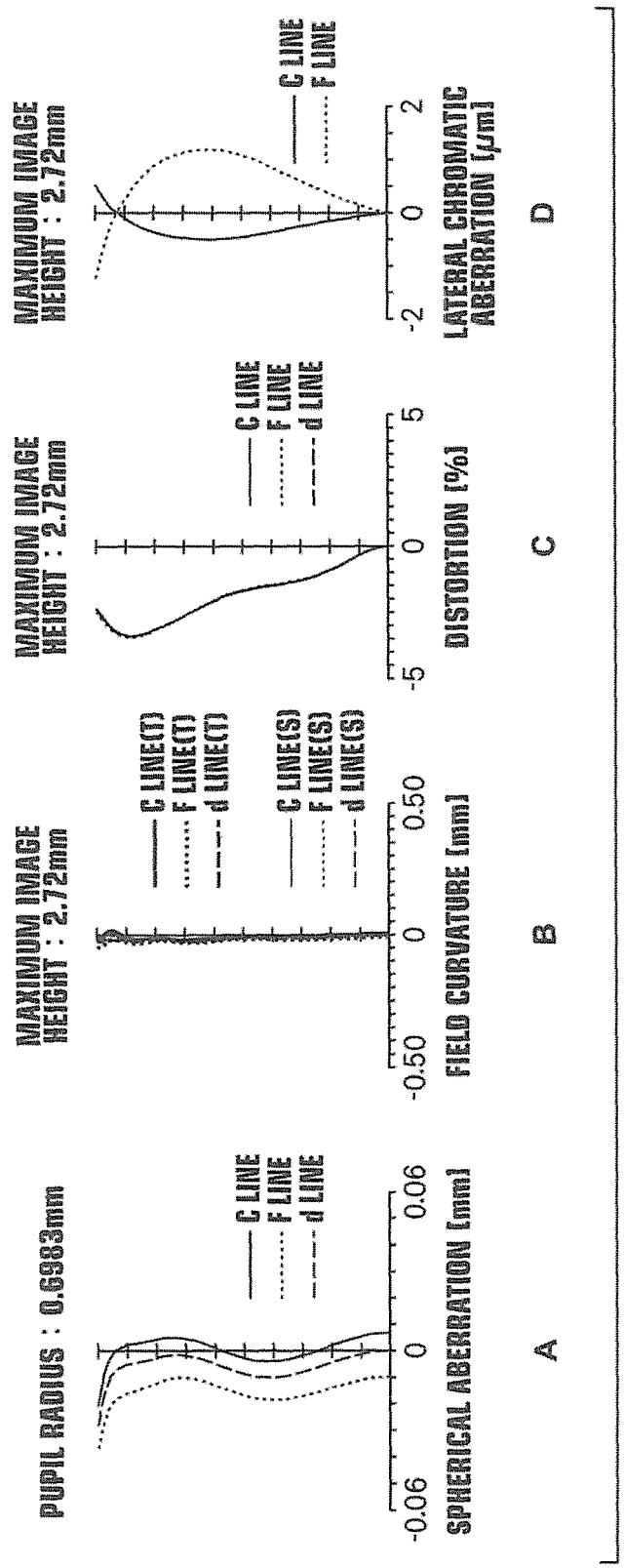
FIG. 9 is a collection of diagrams that illustrate aberrations of the imaging lens of Example 4, wherein A illustrates spherical aberration, B illustrates astigmatism, C illustrates distortion, and D illustrates lateral chromatic aberration.

Similarly, the aberrations of the imaging lens of Example 2 through Example 4 are illustrated in A through D of FIG. 7 through A through D of FIG. 9. The diagrams that illustrate aberrations of A through D of FIG. 6 through A through D of FIG. 9 are all for cases in which the object distance is infinity.

In addition, Table 9 shows values corresponding to Conditional Formulae (1) through (5), respectively summarized for each of Examples 1 through 4. The values shown in Table 9 are those related to the d line.

As can be understood from each set of numerical value data and from the diagrams that illustrate aberrations, the imaging lenses of Examples 1 through 4 have full angles of view within a range from 70 degrees to 75 degrees, and the total lengths TL of the lens systems are within a range from 3.1 mm to 4.0 mm. That is, a shortening of the total length of the lens system is achieved while maintaining a full angle of view which is standard for portable terminals. Further, various aberrations are favorably corrected, and high imaging performance is realized.

Note that the imaging lens of the present disclosure is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

Example 1

TABLE 1

| f = 4.01, Fno. = 2.6, 2ω = 72.0, TL = 3.95 | | | | |
|---|---|---|---|---|
| Si | Ri | Di | Ndj | νdj |
| 1 (aperture stop) | ∞ | −0.240000 | | |
| *2 | 1.248186 | 0.510022 | 1.544884 | 54.87 |
| *3 | −55.853797 | 0.023815 | | |
| *4 | −71.457835 | 0.297217 | 1.633506 | 23.63 |
| *5 | 2.589265 | 0.641525 | | |
| *6 | −26.018306 | 0.107756 | 1.544884 | 54.87 |
| *7 | −4.887691 | 0.550329 | | |
| *8 | −4.378748 | 0.317276 | 1.633506 | 23.63 |
| *9 | −4.502550 | 0.254989 | | |
| *10 | 3.275584 | 0.462402 | 1.544884 | 54.87 |
| *11 | 1.123792 | 0.202904 | | |
| 12 | ∞ | 0.145000 | 1.516330 | 64.14 |
| 13 | ∞ | 0.483940 | | |
| 14 (imaging surface) | ∞ | | | |

*aspherical surface

TABLE 2

| Surface Number | KA | A3 | A4 | A5 | A6 |
|---|---|---|---|---|---|
| 2 | −1.3212468E+01 | −3.2010292E−02 | 9.7127463E−01 | −4.1441026E−01 | −2.9581230E+00 |
| 3 | −2.2162782E+02 | −4.6939205E−02 | 3.5840007E−01 | −7.1668262E−01 | −3.0196076E−01 |
| 4 | −7.7774382E+02 | 4.4862926E−02 | −2.3154381E−02 | 8.9262055E−02 | 9.9153816E−01 |
| 5 | 8.7876118E+00 | 5.3914158E−02 | −1.2205780E−01 | 3.3623397E−01 | 4.7272146E−01 |
| 6 | 7.1848813E+02 | −7.4332479E−02 | 2.2903737E−01 | −8.6386820E−01 | 8.8480140E−01 |
| 7 | −1.4448115E+02 | −1.4680435E−01 | −3.2247983E−01 | 1.0341382E+00 | −2.6759111E+00 |
| 8 | −7.2899625E+02 | 1.5237198E−01 | −1.0965089E+00 | 2.6778406E+00 | −2.4488360E+00 |
| 9 | 2.0001892E+00 | −1.5857648E−01 | 8.3863492E−01 | −1.7144932E+00 | 1.4227139E+00 |
| 10 | −3.6747110E+01 | −3.3308330E−01 | 1.3075487E−01 | −5.4611043E−01 | 6.2320857E−01 |
| 11 | −2.8825648E+00 | −1.6713971E−01 | −9.9582938E−01 | 2.7129347E+00 | −3.7539111E+00 |

| Surface Number | A7 | A8 | A9 | A10 | A11 |
|---|---|---|---|---|---|
| 2 | 5.7748718E+00 | −4.7691207E+00 | 4.1977000E+00 | −3.4405023E+00 | −5.0000669E+00 |
| 3 | 3.2844684E+00 | −4.1040752E+00 | −9.6045412E−01 | 2.9706036E+00 | 3.5660330E+00 |
| 4 | −4.4232849E+00 | 7.5497582E+00 | −5.8084122E+00 | 4.8872207E+00 | −1.4014084E+01 |
| 5 | −3.2661042E+00 | 6.3848549E+00 | −6.4401676E+00 | 7.8102425E+00 | 1.3210099E+01 |
| 6 | 6.0051486E−01 | −2.4844103E+00 | 1.5427055E+00 | 1.0603798E−01 | 3.6771996E−01 |
| 7 | 2.3215258E+00 | 1.9188104E+00 | −4.4289849E+00 | 6.1619829E−01 | 2.1371523E+00 |
| 8 | −5.3397685E−01 | 1.9192393E+00 | −8.3305954E−01 | 1.0221456E+00 | −1.3006852E+00 |
| 9 | 9.6055869E−01 | −3.3196842E+00 | 2.1873641E+00 | 6.9881886E−01 | −9.5523496E−01 |
| 10 | −1.5717115E−01 | −8.0713763E−02 | 3.5601990E−03 | 4.3398861E−02 | 1.1828531E−02 |
| 11 | 2.7630021E+00 | −6.1241496E−01 | −4.7567270E−01 | 2.6601539E−01 | 1.9427965E−02 |

| Surface Number | A12 | A13 | A14 | A15 | A16 |
|---|---|---|---|---|---|
| 2 | 9.4270649E+00 | 2.8026655E+00 | −1.3048820E+01 | 7.9609525E+00 | −1.3947121E+00 |
| 3 | −2.1148237E+01 | −9.0816066E+00 | 3.3006462E+01 | −1.7290734E+01 | −7.6278734E+00 |
| 4 | 2.2137640E+01 | −1.3506303E+01 | −1.3686354E+00 | 5.8899674E+00 | −2.2744994E+00 |
| 5 | −2.5460608E+01 | 1.9589246E+01 | −1.2172121E+01 | 1.7384456E+01 | −1.1580743E+01 |
| 6 | −1.1006658E+00 | −7.2761073E−01 | 3.4862697E+00 | −2.6978835E+00 | 4.7921100E−01 |
| 7 | −8.1536404E−01 | −6.4668408E−01 | 9.4854860E−01 | 4.7417804E−01 | −7.7550745E−01 |
| 8 | 2.1641923E−01 | −3.7471065E−01 | 1.0564631E+00 | −6.2773999E−01 | 1.0266054E−01 |
| 9 | −3.5502699E−01 | 3.4672168E−01 | 1.8713235E−01 | −1.7830886E−01 | 3.3141578E−02 |
| 10 | −3.2945535E−02 | 1.3873446E−02 | −2.9634561E−03 | 9.0292501E−04 | −1.8653823E−04 |
| 11 | −6.3524204E−03 | −3.5187945E−02 | 2.2802501E−02 | −6.1163617E−03 | 6.8179272E−04 |

Example 2

TABLE 3 f = 4.02, Fno. = 2.4, 2ω = 70.8, TL = 3.97

| Si | Ri | Di | Ndj | vdj |
|---|---|---|---|---|
| 1 (aperture stop) | ∞ | −0.290000 | | |
| *2 | 1.266094 | 0.672786 | 1.544884 | 54.87 |
| *3 | −151.018032 | 0.030338 | | |
| *4 | −441.388916 | 0.240335 | 1.613946 | 25.30 |
| *5 | 2.717418 | 0.554476 | | |
| *6 | 6.431903 | 0.098014 | 1.544884 | 54.87 |
| *7 | 18.042506 | 0.648699 | | |

TABLE 3-continued f = 4.02, Fno. = 2.4, 2ω = 70.8, TL = 3.97

| Si | Ri | Di | Ndj | vdj |
|---|---|---|---|---|
| *8 | −2.378787 | 0.361894 | 1.633506 | 23.63 |
| *9 | −2.916855 | 0.163203 | | |
| *10 | 2.379858 | 0.409109 | 1.544884 | 54.87 |
| *11 | 1.225990 | 0.171307 | | |
| 12 | ∞ | 0.145000 | 1.516330 | 64.14 |
| 13 | ∞ | 0.483940 | | |
| 14 (imaging surface) | ∞ | | | |

*aspherical surface

TABLE 4

| Surface Number | KA | A3 | A4 | A5 | A6 |
|---|---|---|---|---|---|
| 2 | −1.3546683E+01 | −2.0041001E−02 | 8.6320095E−01 | −2.9687864E−01 | −2.5818222E+00 |
| 3 | −6.3866451E+07 | −8.8479843E−03 | −6.4169722E−02 | 1.3285020E−02 | −8.8665570E−01 |
| 4 | 2.2470738E+05 | 3.8738636E−02 | −3.0129213E−01 | 1.9466058E−01 | 1.4344934E+00 |
| 5 | 3.4852098E+00 | 9.7704874E−02 | −5.1831249E−01 | 1.5985440E+00 | −1.6955204E+00 |
| 6 | −8.5496409E+01 | 1.2466183E−02 | 8.8808820E−02 | −1.5849718E+00 | 3.3974575E+00 |
| 7 | 8.8779349E+01 | 7.3567526E−02 | −4.4257981E−01 | 4.1835366E−01 | −4.2270092E−01 |
| 8 | −1.0719832E+01 | 7.6862426E−01 | −2.5920829E+00 | 4.0456408E+00 | −3.3570112E+00 |
| 9 | −1.1522838E+00 | −4.1481437E−01 | 6.0247471E−01 | 8.5552085E−01 | −4.0439369E+00 |
| 10 | −6.6918911E+02 | −2.6029840E−01 | 2.7017015E−01 | −5.2969360E−01 | 5.1395184E−01 |
| 11 | −4.2956928E+00 | 4.6365066E−02 | −1.1736117E+00 | 2.7424446E+00 | −3.5662791E+00 |

TABLE 4-continued

| Surface Number | A7 | A8 | A9 | A10 | A11 |
|---|---|---|---|---|---|
| 2 | 5.1200952E+00 | −4.8728445E+00 | 4.5573540E+00 | −2.9231769E+00 | −4.9030421E+00 |
| 3 | 3.4085238E+00 | −3.5149634E+00 | −6.9741276E−01 | 1.5395929E+00 | 1.8327304E+00 |
| 4 | −4.5521078E+00 | 7.1187545E+00 | −6.1302094E+00 | 5.5764031E+00 | −1.3422099E+01 |
| 5 | −1.4874360E+00 | 6.5948462E+00 | −7.1375197E+00 | 1.6899587E−01 | 1.3365746E+01 |
| 6 | −2.2867433E+00 | −2.3581269E+00 | 4.5915662E+00 | −6.4550741E+00 | −2.7520832E+00 |
| 7 | 7.1109144E−01 | −1.0563681E+00 | 8.0860025E−01 | 8.4524672E−01 | −1.9182657E+00 |
| 8 | 1.4653598E+00 | −2.6051260E−01 | −7.2410680E−01 | 1.7154157E+00 | −1.4975887E+00 |
| 9 | 6.0501328E+00 | −4.0794704E+00 | 4.5573227E−01 | 8.5557936E−01 | −2.6728092E−01 |
| 10 | −1.4671011E−01 | −7.7832188E−02 | 7.2591237E−03 | 4.4414319E−02 | 1.1539501E−02 |
| 11 | 2.5522401E+00 | −5.8974927E−01 | −4.1209643E−01 | 2.5474436E−01 | 9.1290136E−03 |

| Surface Number | A12 | A13 | A14 | A15 | A16 |
|---|---|---|---|---|---|
| 2 | 8.7072644E+00 | 2.2065169E+00 | −1.2733195E+01 | 9.4659592E+00 | −2.3930643E+00 |
| 3 | −2.0865169E−01 | −5.0269022E+00 | 4.2580693E+00 | −1.4139627E−01 | −6.9516215E−01 |
| 4 | 2.1410176E+01 | −1.4507410E+01 | −1.7254451E+00 | 8.5122925E+00 | −3.7595037E+00 |
| 5 | −2.3684995E+01 | 1.9389845E+01 | −1.1630677E+01 | 9.9051184E+00 | −4.7152887E+00 |
| 6 | 8.7646059E−01 | 1.0946236E+00 | −2.8524021E−01 | −4.4273006E−01 | 1.8228365E−01 |
| 7 | 6.0526646E−02 | 2.3608540E+00 | −2.1787786E+00 | 7.4005688E−01 | −8.1801266E−02 |
| 8 | 2.2671012E−01 | 5.9375322E−03 | 8.7347247E−01 | −9.5422498E−01 | 2.9178978E−01 |
| 9 | −1.4931670E−01 | 1.0069879E−01 | 1.7219549E−02 | −5.3428722E−01 | 1.9941941E−02 |
| 10 | −3.2936281E−02 | 1.3881989E−02 | −2.9993178E−03 | 8.9292760E−04 | −1.8308586E−04 |
| 11 | −7.3661116E−03 | −3.4038453E−02 | 2.3396624E−02 | −6.0983398E−03 | 5.9611963E−04 |

Example 3

TABLE 5

$f = 3.28$, Fno. $= 2.9$, $2\omega = 71.0$, TL $= 3.16$

| Si | Ri | Di | Ndj | vdj |
|---|---|---|---|---|
| 1 (aperture stop) | ∞ | −0.150000 | | |
| *2 | 0.904212 | 0.430212 | 1.54 | 56.5 |
| *3 | 15.379767 | 0.049238 | | |
| *4 | −3.541585 | 0.154405 | 1.63 | 23.4 |
| *5 | 5.812080 | 0.649693 | | |
| *6 | −1.353189 | 0.266346 | 1.54 | 56.5 |
| *7 | −0.986605 | 0.452364 | | |
| *8 | −6.699546 | 0.305318 | 1.53 | 55.8 |
| *9 | 1.732706 | 0.199933 | | |
| 10 | ∞ | 0.300000 | 1.52 | 64.2 |
| 11 | ∞ | 0.414000 | | |
| 12 (imaging surface) | ∞ | | | |

*aspherical surface

TABLE 6

| Surface Number | KA | A4 | A6 | A8 |
|---|---|---|---|---|
| 2 | −2.5364831E−01 | −7.7531180E−02 | 1.2291438E+00 | −7.8086978E+00 |
| 3 | 5.4910111E+02 | −7.7916259E−02 | 1.1580918E+00 | −8.0037672E+00 |
| 4 | −1.7746510E+02 | 3.6184422E−01 | 1.7638199E−01 | −3.3506962E+00 |
| 5 | 5.6802279E+01 | 9.4031723E−01 | −1.7346081E+00 | 4.1298659E+00 |
| 6 | −3.8980496E+00 | −2.9718521E−01 | −5.1341042E−02 | −1.3962850E+00 |
| 7 | −2.2456465E+00 | −1.5497952E−01 | −1.1631991E−01 | −8.2951567E−01 |
| 8 | −5.6571673E+02 | −5.7255470E−01 | 2.1662849E−01 | 4.7834559E−02 |
| 9 | −2.4328185E+00 | −5.2468297E−01 | 3.5563560E−01 | −1.7762108E−01 |

| Surface Number | A10 | A12 | A14 | A16 |
|---|---|---|---|---|
| 2 | 2.5493056E+01 | −3.9257511E+01 | 1.0109932E+01 | — |
| 3 | −3.2910059E+00 | 4.8825625E+01 | −5.3320887E+01 | — |
| 4 | −1.4906025E+01 | 6.4462794E+01 | −4.4088031E+01 | — |
| 5 | 2.8621841E+00 | −4.0818628E+01 | 8.9829881E+01 | — |
| 6 | −5.5220011E+00 | 1.0096910E+01 | 4.2807378E+01 | −9.3219929E+01 |
| 7 | 4.9274804E−01 | 1.0709023E+00 | 7.4971290E−01 | −1.5027177E+00 |
| 8 | −1.4041772E−02 | −5.6061872E−03 | −8.8286172E−04 | 3.5631882E−04 |
| 9 | 4.0696121E−02 | 9.3405871E−04 | −1.9104675E−03 | −3.8773448E−05 |

Example 4

TABLE 7

$f = 4.00$, Fno. $= 2.8$, $2\omega = 71.2$, TL $= 3.89$

| Si | Ri | Di | Ndj | vdj |
|---|---|---|---|---|
| 1 (aperture stop) | ∞ | −0.210000 | | |
| *2 | 1.152778 | 0.303593 | 1.51 | 56.8 |
| *3 | 10.159658 | 0.077275 | | |
| *4 | 6.219245 | 0.104330 | 1.65 | 21.4 |
| *5 | 2.353031 | 0.354965 | | |
| *6 | −8.266512 | 0.123829 | 1.63 | 23.8 |
| *7 | −9.893200 | 0.643763 | | |
| *8 | −7.130996 | 0.292307 | 1.54 | 55.9 |
| *9 | −2.086276 | 0.534767 | | |
| *10 | −1.378463 | 0.183911 | 1.54 | 55.9 |
| *11 | −0.920547 | 0.233322 | | |
| *12 | −1.368934 | 0.148256 | 1.54 | 55.9 |
| *13 | 2.390504 | 0.197715 | | |
| 14 | ∞ | 0.210000 | 1.52 | 64.2 |
| 15 | ∞ | 0.483000 | | |
| 16 (imaging surface) | ∞ | | | |

*aspherical surface

TABLE 8

| Surface Number | KA | A4 | A6 | A8 |
|---|---|---|---|---|
| 2 | −3.6867724E+00 | 3.1176600E−01 | −1.4930332E−01 | 1.7504183E−01 |
| 3 | 1.0606410E+02 | −3.8781814E−02 | 2.0910481E−01 | −1.9854100E−01 |
| 4 | −1.7515826E+02 | 1.1785485E−01 | 1.1554505E−01 | 3.6431461E−01 |
| 5 | 5.0856043E+00 | 3.5888263E−02 | 1.8292402E−01 | 5.4039908E−02 |
| 6 | −4.5000559E+02 | −4.2967593E−01 | −7.8724390E−02 | 3.1271252E−01 |
| 7 | 8.9111829E+01 | −3.0460387E−01 | −1.2351341E−01 | 2.5016114E−01 |
| 8 | 5.1118472E+01 | −9.6634327E−02 | −4.4717695E−02 | −2.4893022E−01 |
| 9 | 1.9974438E+00 | −3.3887166E−03 | 7.9466818E−03 | −1.8748970E−01 |
| 10 | 8.6332365E−02 | 7.9464707E−02 | −2.7323299E−04 | −5.7513127E−03 |
| 11 | −5.4955726E+00 | −1.0388535E−01 | 1.2895780E−01 | −1.2652192E−01 |
| 12 | −1.1130744E+01 | −1.0314252E−01 | −8.3726210E−03 | 1.4326135E−02 |
| 13 | −5.8582439E+01 | −9.2038345E−02 | 1.5566690E−02 | −4.8717366E−03 |

| Surface Number | A10 | A12 | A14 |
|---|---|---|---|
| 2 | −8.5732546E−02 | 1.6208774E−01 | −3.0035684E−01 |
| 3 | −1.2898235E−01 | 1.2956948E−01 | −2.8085047E−01 |
| 4 | −1.1770860E+00 | 1.0492300E+00 | −6.1806181E−01 |
| 5 | −3.4390106E−01 | 5.0461465E−01 | 4.1455242E−01 |
| 6 | −4.3734148E−01 | 1.0916784E+00 | 9.5251613E−01 |
| 7 | 2.6149050E−03 | 2.5484908E−01 | 5.3657077E−01 |
| 8 | 8.9553971E−02 | 1.2207775E−02 | −5.4313761E−03 |
| 9 | 6.5975151E−02 | 3.8594080E−02 | 2.1027712E−03 |
| 10 | 6.1913902E−02 | 5.6036573E−03 | −3.1744398E−03 |
| 11 | 6.6704873E−02 | −1.8282427E−02 | 1.7661958E−03 |
| 12 | −1.0472867E−03 | −2.4046169E−04 | −6.5030890E−06 |
| 13 | 1.5445189E−03 | −3.6152741E−04 | 1.5330880E−05 |

TABLE 9

Values Related to Conditional Formulae

| Formula | Condition | Example 1 | Example 2 | Example 3 | Example 4 |
|---|---|---|---|---|---|
| (1) | TL/f | 0.99 | 0.99 | 0.96 | 0.97 |
| (2) | f/f1 | 1.79 | 1.74 | 1.87 | 1.60 |
| (3) | f | 4.01 | 4.02 | 3.28 | 4.00 |
| (4) | f1 | 2.25 | 2.31 | 1.75 | 2.50 |
| (5) | Da/f | 0.006 | 0.008 | 0.015 | 0.019 |

What is claimed is:

1. An imaging lens consisting of five lenses, including, in order from the object side to the image side:
a first lens having a positive refractive power;
a second lens having a negative refractive power;
a third lens having a positive refractive power;
a fourth lens having a negative refractive power; and
a fifth lens having a negative refractive power;
an aperture stop being positioned at the object side of the surface toward the object side of the first lens; and
the conditional formulae below being satisfied:

$$0.8 < TL/f < 1.0 \tag{1}$$

$$1.0 < f/f1 < 3.0 \tag{2}$$

$$2.03 \text{ mm} \leq f < 5.16 \text{ mm} \tag{3}$$

$$1.0 \text{ mm} \leq f1 < 3.0 \text{ mm} \tag{4}$$

wherein f is the focal length of the entire lens system, f1 is the focal length of the first lens, and TL is the distance along the optical axis from the surface of the first lens toward the object side to the paraxial focal point position at the image side in the case that the portion corresponding to back focus is an air converted length.

2. An imaging lens as defined in claim 1, in which the conditional formula below is further satisfied:

$$0.003 < Da/f < 0.050 \tag{5}$$

wherein Da is the distance along the optical axis between the first lens and the second lens.

3. An imaging lens as defined in claim 1, wherein:
the surface of the second lens toward the image side is a concave surface.

4. An imaging lens as defined in claim 1, wherein:
a second negative lens from the object side from among negative lenses within the entire lens system has a concave surface toward the object side.

5. An imaging lens as defined in claim 1, wherein:
the lens most toward the image side to be a negative lens has a concave surface toward the image side.

6. An imaging lens as defined in claim 1, wherein:
the surface toward the image side of the lens most toward the image side is an aspherical surface having an inflection point, which is concave in the vicinity of the optical axis.

7. An imaging lens as defined in claim 1, in which the conditional formula below is further satisfied:

$$0.9 < TL/f < 1.0 \quad (1\text{-}1).$$

8. An imaging lens as defined in claim 1, in which the conditional formula below is further satisfied:

$$1.2 < f/f1 < 2.5 \quad (2\text{-}1).$$

9. An imaging lens as defined in claim 1, in which the conditional formula below is further satisfied:

$$1.7 < f/f1 < 2.0 \quad (2\text{-}2).$$

10. An imaging lens as defined in claim 1, in which the conditional formula below is further satisfied:

$$0.004 < Da/f < 0.040 \quad (5\text{-}1)$$

wherein Da is the distance along the optical axis between the first lens and the second lens.

11. An imaging lens as defined in claim 1, in which the conditional formula below is further satisfied:

$$0.005 < Da/f < 0.030 \quad (5\text{-}2)$$

wherein Da is the distance along the optical axis between the first lens and the second lens.

12. An imaging apparatus comprising the imaging lens as defined in claim 1.

13. An imaging lens consisting of four lenses, including, in order from the object side to the image side:
a first lens having a positive refractive power;
a second lens having a negative refractive power;
a third lens having a positive refractive power; and
a fourth lens having a negative refractive power;
an aperture stop being positioned at the object side of the surface toward the object side of the first lens; and
the conditional formulae below being satisfied:

$$0.8 < TL/f < 1.0 \quad (1)$$

$$1.0 < f/f1 < 3.0 \quad (2)$$

$$2.03 \text{ mm} < f < 5.16 \text{ mm} \quad (3)$$

$$1.0 \text{ mm} < f1 < 3.0 \text{ mm} \quad (4)$$

wherein f is the focal length of the entire lens system, f1 is the focal length of the first lens, and TL is the distance along the optical axis from the surface of the first lens toward the object side to the paraxial focal point position at the image side in the case that the portion corresponding to back focus is an air converted length.

14. An imaging apparatus comprising the imaging lens as defined in claim 13.

15. An imaging lens consisting of six lenses, including, in order from the object side to the image side:
a first lens having a positive refractive power;
a second lens having a negative refractive power; and
four lenses;
an aperture stop being positioned at the object side of the surface toward the object side of the first lens; and
the conditional formulae below being satisfied:

$$0.8 < TL/f < 1.0 \quad (1)$$

$$1.0 < f/f1 < 3.0 \quad (2)$$

$$2.03 \text{ mm} < f < 5.16 \text{ mm} \quad (3)$$

$$1.0 \text{ mm} < f1 < 3.0 \text{ mm} \quad (4)$$

$$0.004 < Da/f < 0.040 \quad (5\text{-}1)$$

wherein f is the focal length of the entire lens system, f1 is the focal length of the first lens, TL is the distance along the optical axis from the surface of the first lens toward the object side to the paraxial focal point position at the image side in the case that the portion corresponding to back focus is an air converted length, and Da is the distance along the optical axis between the first lens and the second lens.

16. An imaging lens as defined in claim 15, wherein the four lenses, which are, in order from the object side to the image side:
a third lens having a negative refractive power;
a fourth lens having a positive refractive power;
a fifth lens having a positive refractive power; and
a sixth lens having a negative refractive power.

17. An imaging apparatus comprising the imaging lens as defined in claim 15.

* * * * *